US007995851B2

(12) United States Patent
Lee et al.

(10) Patent No.: US 7,995,851 B2
(45) Date of Patent: Aug. 9, 2011

(54) METHOD OF, AND APPARATUS FOR IMAGE ENHANCEMENT TAKING AMBIENT ILLUMINANCE INTO ACCOUNT

(75) Inventors: Seong-deok Lee, Suwon-si (KR); Chang-veong Kim, Yongin-si (KR); Dmitry Lebedev, Moscow (RU); Galina Rozhkova, Moscow (RU); Vladmir Bastakov, Moscow (RU); Young-Shin Kwak, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 965 days.

(21) Appl. No.: 11/353,955

(22) Filed: Feb. 15, 2006

(65) Prior Publication Data

US 2006/0187242 A1 Aug. 24, 2006

(30) Foreign Application Priority Data

Feb. 18, 2005 (KR) ........................ 10-2005-0013767

(51) Int. Cl.
*G06K 9/40* (2006.01)
*G06K 9/38* (2006.01)
*G09G 3/20* (2006.01)
*G09G 3/22* (2006.01)
*G09G 3/30* (2006.01)
*G09G 1/06* (2006.01)

(52) U.S. Cl. .......... 382/254; 382/272; 382/274; 345/11; 345/77; 345/74.1; 345/75.1; 345/75.2

(58) Field of Classification Search ........................ None
See application file for complete search history.

(56) References Cited

U.S. PATENT DOCUMENTS 4,005,444 A * 1/1977 Uchiyama et al. .............. 396/61
4,075,655 A * 2/1978 Iijima et al. ................ 348/394.1
4,975,970 A * 12/1990 Zettel et al. .................... 382/131
5,057,744 A * 10/1991 Barbier et al. .................. 315/10
5,351,141 A * 9/1994 Tsuji et al. ..................... 358/520
5,355,149 A * 10/1994 Casebolt ........................ 345/175
5,406,305 A * 4/1995 Shimomura et al. .......... 345/102
5,597,223 A * 1/1997 Watanabe et al. ............... 353/97
5,724,456 A * 3/1998 Boyack et al. ................ 382/274
5,774,599 A * 6/1998 Muka et al. .................... 382/254
5,805,196 A * 9/1998 Nakanishi et al. ............ 347/230
5,848,224 A * 12/1998 Nhu ................................ 358/1.9
6,049,632 A * 4/2000 Cockshott et al. ............ 382/239
6,232,953 B1 * 5/2001 Graham et al. ............... 345/596
6,337,675 B1 * 1/2002 Toffolo et al. .................. 345/77
6,380,943 B1 * 4/2002 Morita et al. ................. 345/589
6,438,256 B1 * 8/2002 Rubin et al. .................. 382/108
6,579,239 B1 * 6/2003 Avinash et al. ............... 600/443
6,711,302 B1 * 3/2004 Lee .............................. 382/275
(Continued)

*Primary Examiner* — Vikkram Bali
*Assistant Examiner* — Michelle Entezari
(74) *Attorney, Agent, or Firm* — Staas & Halsey LLP

(57) ABSTRACT

A method of and an apparatus for image enhancement taking ambient illuminance into consideration. The image enhancement method includes calculating an original-luminance contrast which is a luminance contrast with respect to an original-luminance of pixels forming an original image, calculating a fade-luminance by reflecting the variation of perceived luminance based on an ambient illuminance into the original-luminance, calculating a defade-luminance by converting the fade-luminance to maintain the original-luminance contrast, and calculating a display-luminance by reflecting the variation of perceived luminance by the ambient illuminance into the defade-luminance. Improving luminance contrast through adjustment of luminance based on ambient illuminance, effectively reduces the fade phenomenon.

20 Claims, 6 Drawing Sheets

U.S. PATENT DOCUMENTS 6,766,064 B1 * 7/2004 Langan et al. ................ 382/274
6,894,697 B2 * 5/2005 Matsuda ....................... 345/589
6,952,193 B2 * 10/2005 Abe et al. ........................ 345/87
6,977,712 B2 * 12/2005 Whitted et al. ............... 349/199
7,123,220 B2 * 10/2006 Hanari et al. .................. 345/77
7,170,634 B2 * 1/2007 Kanai ............................ 358/1.9
7,283,683 B1 * 10/2007 Nakamura et al. ............ 382/274
7,289,679 B2 * 10/2007 Prakash ........................ 382/250
7,345,692 B2 * 3/2008 Wada ............................ 345/600
7,362,336 B2 * 4/2008 Miller et al. .................. 345/589
7,592,979 B2 * 9/2009 Hayama et al. .............. 345/75.2
7,656,383 B2 * 2/2010 Hedrick ........................ 345/102
7,660,477 B2 * 2/2010 Wales et al. ................... 382/254
7,812,792 B2 * 10/2010 Lee .............................. 345/75.2
7,872,619 B2 * 1/2011 Miller et al. .................... 345/77
2001/0010517 A1 * 8/2001 Iimura et al. .................. 345/426
2001/0040628 A1 * 11/2001 Akahori et al. ............... 348/229
2002/0142808 A1 * 10/2002 Abbasi .......................... 455/566
2002/0190932 A1 * 12/2002 Ge ............................... 345/75.1
2003/0103141 A1 * 6/2003 Bechtel et al. ................ 348/148
2003/0169281 A1 * 9/2003 Nishi et al. .................... 345/690
2004/0019253 A1 * 1/2004 Tsujita et al. ................. 600/118
2004/0042676 A1 * 3/2004 Srinivasa ...................... 382/254
2004/0227719 A1 * 11/2004 Chang et al. .................. 345/102
2005/0074232 A1 * 4/2005 Nakata et al. ................. 396/111
2005/0104838 A1 * 5/2005 Sasaki .......................... 345/102
2005/0146651 A1 * 7/2005 Whitted et al. ................. 349/58
2005/0162360 A1 * 7/2005 Ishihara et al. ................. 345/89
2005/0180629 A1 * 8/2005 Masuno et al. ............... 382/169
2005/0206745 A1 * 9/2005 Daiku et al. ............... 348/226.1
2005/0234656 A1 * 10/2005 Schwartz et al. ............... 702/20
2006/0038807 A1 * 2/2006 Eckhardt et al. .............. 345/207
2006/0146003 A1 * 7/2006 Diefenbaugh et al. ........ 345/102
2007/0109447 A1 * 5/2007 Yamashita et al. ............ 348/602
2007/0188623 A1 * 8/2007 Yamashita et al. ......... 348/222.1

* cited by examiner

METHOD OF, AND APPARATUS FOR IMAGE ENHANCEMENT TAKING AMBIENT ILLUMINANCE INTO ACCOUNT

CROSS-REFERENCE TO RELATED APPLICATIONS

This application claims the benefit of Korean Patent Application No. 2005-13767, filed Feb. 18, 2005, in the Korean Intellectual Property Office, the disclosure of which is incorporated herein by reference.

BACKGROUND OF THE INVENTION

1. Field of the Invention

Aspects of the present invention relate to a method of and an apparatus for image enhancement. More particularly, aspects of the present invention relate to a method of and an apparatus for image enhancement which enhances luminance contrast by luminance adjustment.

2. Description of the Related Art

When a display device such as a TV, a monitor, or a mobile phone is in a brighter place where ambient illuminance is high, a human eye perceives relatively decreased luminance contrast compared to the image being actually displayed. The reduction of luminance contrast leads to a reduction of image clarity. The reduction of image clarity is called a 'fade' phenomenon.

For example, when the luminance contrast of an original image as shown in FIG. 1A reduces to the luminance contrast as shown in FIG. 1B due to high ambient illuminance, the fade phenomenon occurs. FIGS. 1A and 1B show mean and standard deviation (std) values.

In order to provide a clearer image, the fade phenomenon must be appropriately controlled or compensated, such as by improving the luminance contrast of the image being displayed.

A conventionally available way to improve the luminance contrast and thus reduce the fade phenomenon, is to simply expand luminance distribution. However, due to limited range of expansion of the luminance distribution, the fade phenomenon has not been effectively controlled or compensated.

SUMMARY OF THE INVENTION

To overcome the above and/or other problems occurring in the conventional display devices, an aspect of the present invention provides an apparatus for and a method of image enhancement, which reduces a fade phenomenon by enhancing luminance contrast through adjustment of image luminance based on the ambient illuminance.

The above and/or other aspects are achieved by providing an image enhancement method, comprising calculating an original-luminance contrast which is a luminance contrast with respect to an original-luminance of pixels forming an original image, calculating a fade-luminance by reflecting a variation of perceived luminance based on an ambient illuminance into the original-luminance, calculating a defade-luminance by converting the fade-luminance to maintain the original-luminance contrast, and calculating a display-luminance by reflecting the variation of perceived luminance by the ambient illuminance into the defade-luminance.

The calculating of the defade-luminance may comprise calculating a fade-average luminance by using the fade-luminance and the fade-luminance values with respect to neighboring pixels, adding the original-luminance contrast with a predetermined weight, and multiplying the fade-average luminance by the result of the adding, and outputting the result of multiplication as the defade-luminance. The predetermined weight may be '1'.

The calculating of the defade-luminance may further comprise limiting the defade-luminance within a predetermined luminance range when the defade-luminance is out of the predetermined range.

When the defade-luminance is not more than a first sum, which is a sum of ambient luminance corresponding to the ambient illuminance and a predetermined lowest luminance, the he defade-luminance may be limited by changing the defade-luminance to the first sum, and when the defade-luminance exceeds a second sum, which is a sum of the ambient luminance corresponding to the ambient illuminance and a predetermined highest luminance, the defade-luminance may be limited by changing the defade-luminance to the second sum.

The calculating of the display-luminance may comprise subtracting the defade-luminance and the ambient luminance corresponding to the ambient illuminance, and outputting a result of the subtracting as the display-luminance.

The calculating of the original-luminance contrast may comprise calculating an original-average luminance by using the original-luminance and original-luminance values with respect to neighboring pixels, calculating an original-luminance difference by subtracting the original-average luminance from the original-luminance, and dividing the original-luminance difference by the original-average luminance, and outputting the result of the dividing as the original-luminance contrast.

The calculating of the fade-luminance may comprise converting the ambient illuminance as being input, into a corresponding ambient luminance, and adding the ambient luminance with the original-luminance, and outputting the result of adding as the fade-luminance.

The calculating of the fade-luminance may use one of the ambient illuminance as being sensed by a predetermined sensing part and the ambient illuminance as being input by a predetermined input part.

The above and or other aspects may also be achieved by providing an image enhancement apparatus, comprising an original-luminance contrast calculation part calculating an original-luminance contrast which is a luminance contrast with respect to an original-luminance of pixels forming an original image, a fade-luminance calculation part calculating a fade-luminance by reflecting a variation of perceived luminance based on an ambient illuminance into the original-luminance, a defade-luminance calculation part calculating a defade-luminance by converting the fade-luminance, which is calculated by the fade-luminance calculation part, to maintain the original-luminance contrast which is calculated by the original-luminance contrast calculation part, and a display-luminance calculation part calculating a display-luminance by reflecting the variation of the perceived luminance by the ambient illuminance into the defade-luminance calculated by the defade-luminance calculation part.

The defade-luminance calculation part may comprises a LPF (Low pass filter) calculating a fade-average luminance by using the fade-luminance calculated by the fade-luminance calculation part and the fade-luminance values with respect to neighboring pixels, an adding part adding the original-luminance contrast calculated by the original-luminance contrast calculation part with a predetermined weight, and a multiplying part multiplying the fade-average luminance calculated by the LPF by the result of adding calculated by the adding part, and outputting the result of multiplication as the defade-luminance. The predetermined weight may be '1'.

The defade-luminance calculation part may further comprise a limiting part limiting the defade-luminance within a predetermined luminance range when the defade-luminance is out of the predetermined range.

When the defade-luminance is not more than a first sum, which is the sum of ambient luminance corresponding to the ambient illuminance with a predetermined lowest luminance, the limiting part may limit the defade-luminance by changing the defade-luminance to the first sum, and when the defade-luminance exceeds a second sum, which is the sum of the ambient luminance corresponding to the ambient illuminance with a predetermined highest luminance, the limiting part may limit the defade-luminance by changing the defade-luminance to the second sum.

The display-luminance calculation part may subtract the ambient luminance corresponding to the ambient illuminance from the defade-luminance, and output the result of the subtracting as the display-luminance.

The original-luminance contrast calculation part may comprise a low pass filter (LPF) calculating an original-average luminance by using the original-luminance and original-luminance values with respect to neighboring pixels, a subtracting part calculating an original-luminance difference by subtracting the original-average luminance which is calculated by the LPF from the original-luminance, and a dividing part dividing the original-luminance difference calculated by the subtracting part by the original-average luminance calculated by the LPF, to output the result of division as the original-luminance contrast.

The fade-luminance calculation part may comprise a converting part converting the ambient illuminance as being externally input, into a corresponding ambient luminance, and an adding part adding the external luminance converted by the converting part, with the original-luminance, to output the result of adding as the fade-luminance.

The fade-luminance calculation part may use one of the ambient illuminance as being sensed by a predetermined sensing part and the ambient illuminance as being input by an input part.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1A:
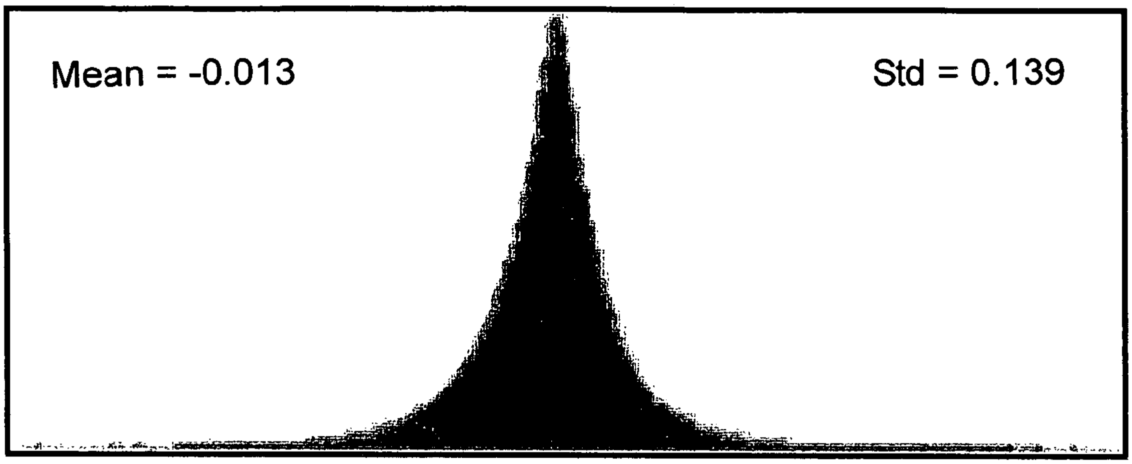
FIG. 1A (PRIOR ART)
FIGS. 1A and 1B are graphs showing a fade phenomenon generated due to high ambient illuminance.
Figure 1B:
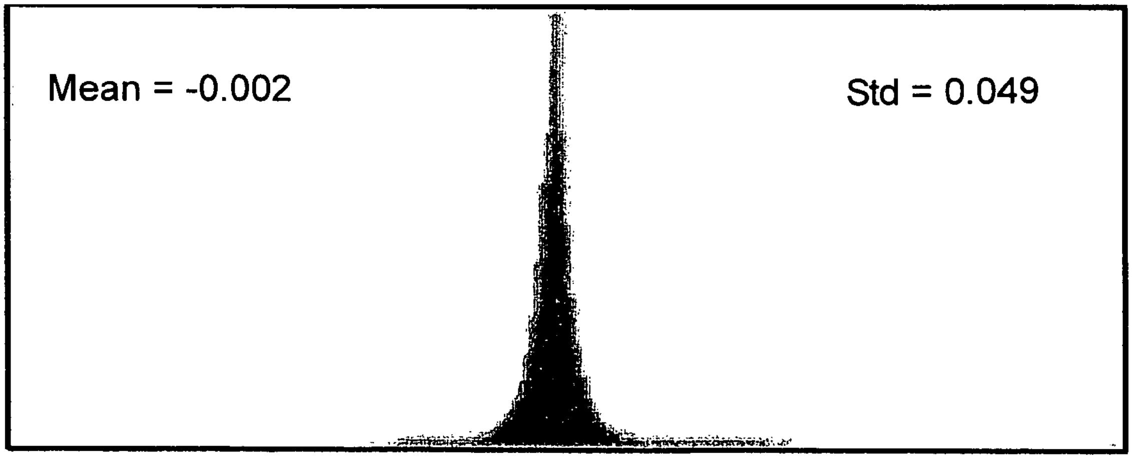
FIG. 1B (PRIOR ART)

Reference will now be made in detail to the present embodiments of the present invention, examples of which are illustrated in the accompanying drawings, wherein like reference numerals refer to the like elements throughout. The embodiments are described below in order to explain the present invention by referring to the figures. Well known functions or constructions are not described in detail to avoid obscuring the invention in unnecessary detail.

Figure 2:
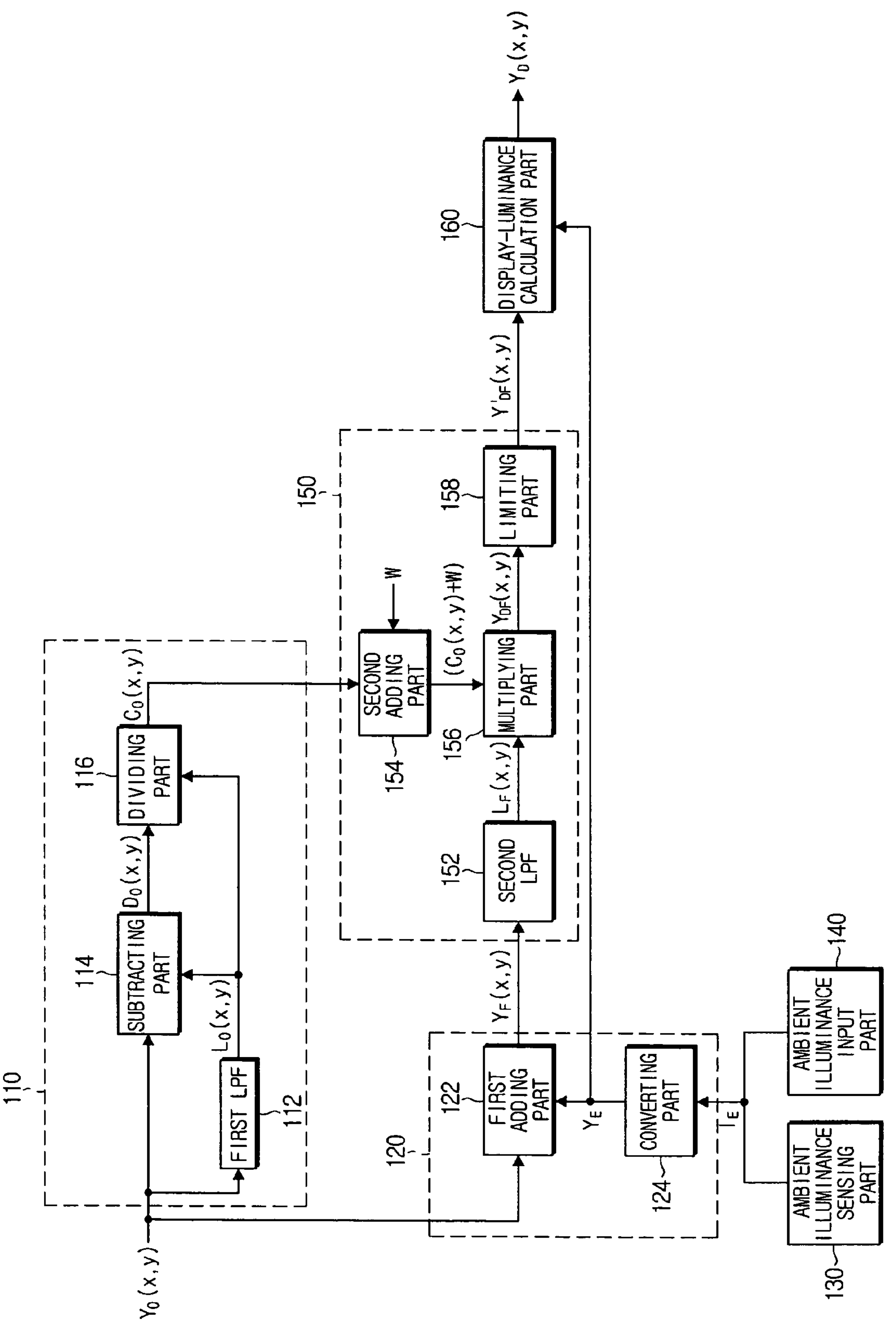
FIG. 2 is a block diagram of an image enhancement apparatus which takes ambient illuminance into account according to an embodiment of the present invention.

FIG. 2 is a block diagram of an image enhancement apparatus according to an embodiment of the present invention. The image enhancement apparatus according to the embodiment shown in FIG. 2 enhances luminance contrast by adjusting a luminance of the image. In the enhancement of luminance contrast through luminance adjustment, the image enhancement apparatus takes ambient illuminance into account. Accordingly, a lesser fade phenomenon will occur in the image being displayed even with high ambient illuminance.

The image enhancement apparatus according to the embodiment shown in FIG. 2 may include an original-luminance contrast calculation part 110, a fade-luminance calculation part 120, an ambient illuminance sensing part 130, an ambient illuminance input part 140, a defade-luminance calculation part 150 and a display-luminance calculation part 160.

The original-luminance contrast calculation part 110 calculates luminance contrast with respect to original-luminance ($C_o(x, y)$) (hereinafter called original-luminance contrast), by using original-luminance ($Y_o(x, y)$) as being input. The term 'original-luminance contrast' refers to the luminance of the pixels forming the original image. The original-luminance contrast calculation part 110 may include a first low pass filter (LPF) 112, a subtracting part 114 and a dividing part 116.

The fade-luminance calculation part 120 calculates fade-luminance ($Y_F(x, y)$) by using the original-luminance ($Y_o(x, y)$) and the ambient illuminance ($I_E$). In detail, the fade-luminance calculation part 120 calculates fade-luminance ($Y_F(x, y)$) by reflecting a luminance variance, as perceived by the ambient illuminance ($I_E$), into the original-luminance ($Y_o(x, y)$). The fade-luminance calculation part 120 includes a first adding part 122 and a converting part 124.

The ambient illuminance sensing part 130 measures the ambient illuminance of the place where the display device is located. The ambient illuminance input part 140 may operate as an interface through which the ambient illuminance may be input directly by a user, or indirectly through an external device (not shown). The image enhancement apparatus may include one or both of the ambient illuminance sensing part 130 and the ambient illuminance input part 140.

The defade luminance calculation part 150 calculates defade-luminance ($Y'_{DF}(x, y)$), by using the original-luminance contrast ($C_o(x, y)$) being output from the original-luminance contrast calculation part 110 and the fade-luminance ($Y_F(x, y)$) being output from the fade-luminance calculation part 120. In detail, the defade-luminance calculation part 150 converts the fade-luminance ($Y_F(x, y)$) to maintain the original-luminance contrast ($C_o(x, y)$) so that the defade-luminance ($Y'_{DF}(x, y)$) can be calculated. The defade-luminance calculation part 150 may include a second LPF 152, a second adding part 154, a multiplying part 156 and a limiting part 158.

The display-luminance calculation part 160 calculates display-luminance ($Y_D$(x, y)), by using the defade-luminance ($Y'_{DF}$(x, y)) being output from the defade-luminance calculation part 150 and ambient luminance ($Y_E$) being output from the fade-luminance calculation part 120. The display-luminance calculation part 160 may calculate the display-luminance ($Y_D$(x, y)), by reflecting the luminance variation as perceived by the ambient illuminance ($I_E$) into the defade-luminance ($Y'_{DF}$(x, y)).

Figure 3:
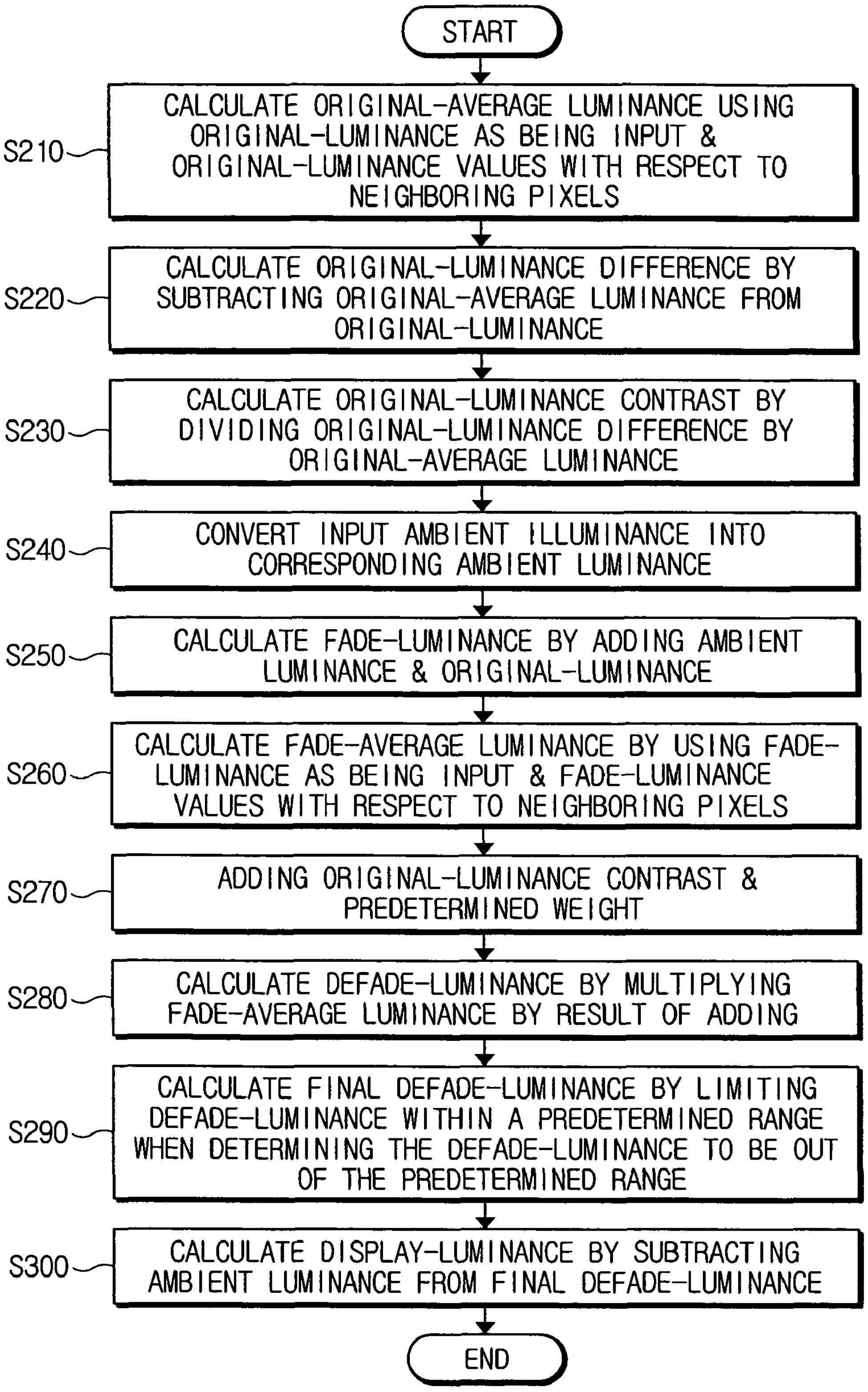
FIG. 3 is a flowchart provided to explain an image enhancement method which takes ambient illuminance into account according to an embodiment of the present invention.

A process of enhancing luminance contrast using ambient illuminance-based luminance adjustment by the image enhancement apparatus according to the embodiment of the present invention shown in FIG. 2 will now be described below with reference to FIGS. 2 and 3. FIG. 3 is a flowchart explaining a method of image enhancement which takes ambient illuminance into account according to an embodiment of the present invention.

Referring to FIGS. 2 and 3, the first LPF 112 of the original-luminance contrast calculation part 110 calculates original-average luminance ($L_o$(x, y)), by using the original-luminance ($Y_o$(x, y)) being input and the original-luminance of neighboring pixels (S210). More specifically, the first LPF 112 multiplies the above luminance values by corresponding coefficients, sums the results of the multiplications, and thus calculates the original-average luminance ($L_o$(x, y)). The original-average luminance may be calculated as shown in expression (1):

$$L_o(x, y) = \sum_{i=-2\sim+2} \sum_{j=-2\sim+2} f_{LPF}(i, j) \times Y_o(x+i, y+j) \tag{1}$$

According to the expression (1), the size of a mask is 5(i=−2,−1,0,+1,+2)×5(j=−2,−1,0,+1,+2). Examples of the coefficients ($f_{LPF}$(i, j)) of the 5×5 mask are shown in Table 1.

TABLE 1

| | i = −2 | i = −1 | i = 0 | i = +1 | i = +2 |
|---|---|---|---|---|---|
| J = −2 | 1/256 | 4/256 | 6/256 | 4/256 | 1/256 |
| J = −1 | 4/256 | 16/256 | 24/256 | 16/256 | 4/256 |
| J = 0 | 6/256 | 24/256 | 36/256 | 24/256 | 6/256 |
| J = +1 | 4/256 | 16/256 | 24/256 | 16/256 | 4/256 |
| J = +2 | 1/256 | 4/256 | 6/256 | 4/256 | 1/256 |

Next, the subtracting part 114 calculates original-luminance difference ($D_o$(x, y)) by subtracting and the original-average luminance ($L_o$(x, y)) from the original-luminance ($Y_o$(x, y)) (S220). The original-luminance difference ($D_o$(x, y)) may be calculated as shown in expression (2):

$$D_o(x,y)=Y_o(x,y)-L_o(x,y) \tag{2}$$

Next, the dividing part 116 calculates the original-luminance contrast ($C_o$(x, y)), by dividing the original-luminance difference ($D_o$(x, y)) by the original-average luminance ($L_o$(x, y)) (S230). The original-luminance contrast ($C_o$(x, y)) may be calculated as shown in expression (3):

$$C_O(x, y) = \frac{D_O(x, y)}{L_O(x, y)} \tag{3}$$

The operations of S210 through S230 will be described below, with reference to an actual original image.

Figure 4A:
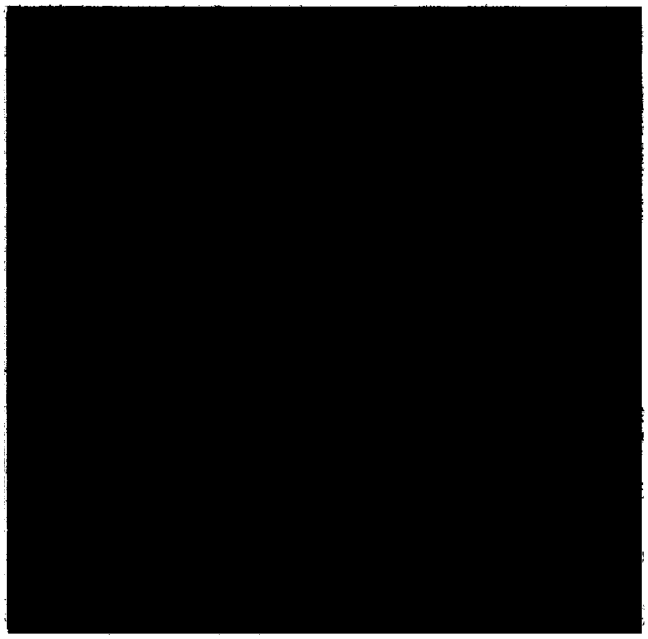
FIGS. 4A to 4D are views provided for additionally explaining the process of calculating original-luminance contrast according to an embodiment of the present invention.
Figure 4B:
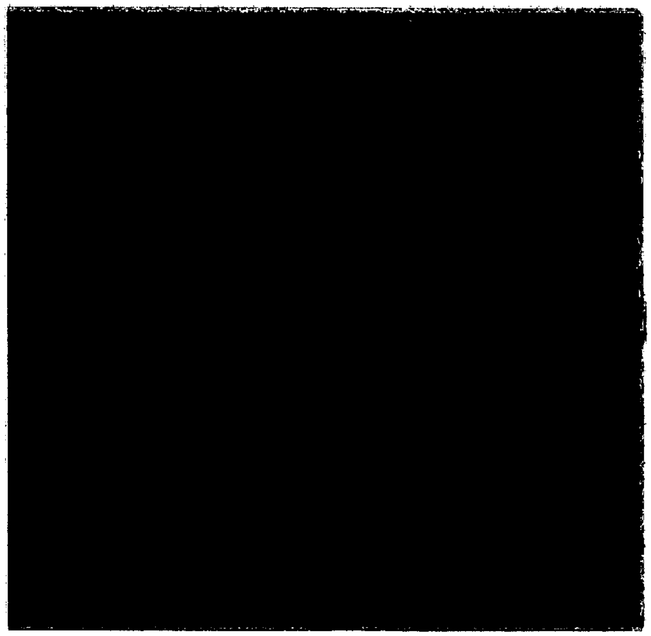
Figure 4C:
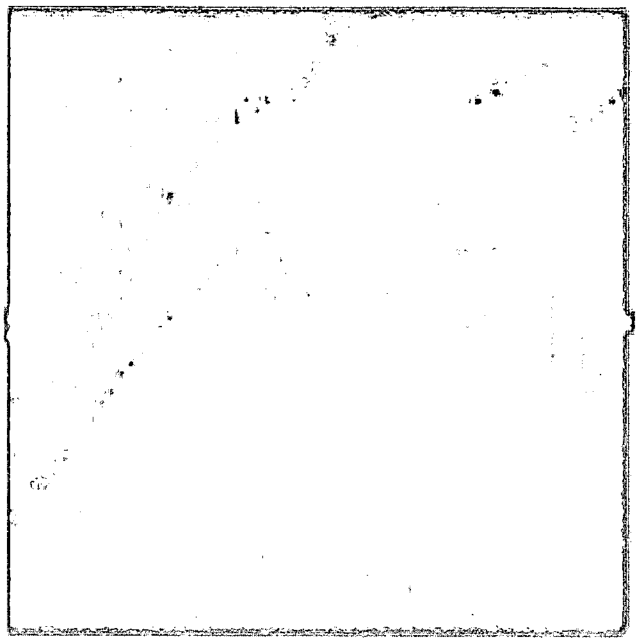
Figure 4D:
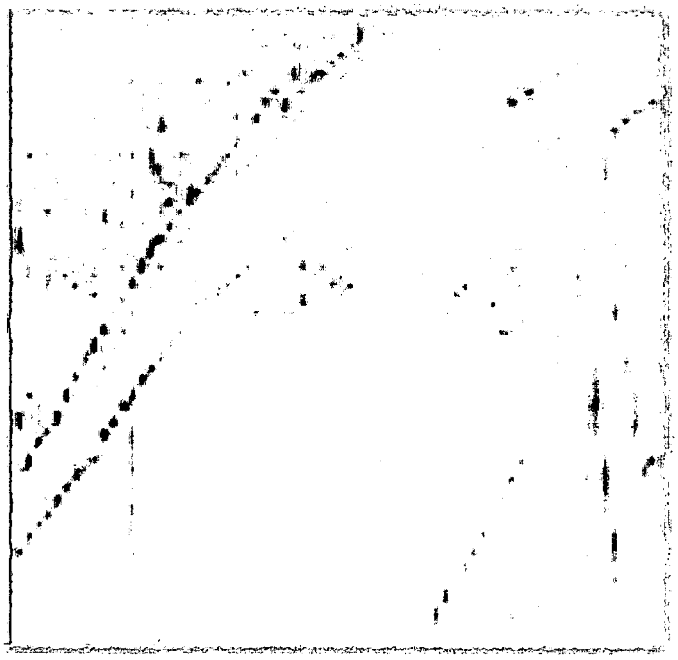

An original image having the original-luminance ($Y_o$(x, y)) is shown in FIG. 4A. FIG. 4B shows the image constituted using the original-average luminance ($L_o$(x, y)). Additionally, FIG. 4C shows the image being constituted by the original-luminance differences ($D_o$(x, y)) and FIG. 4D shows the image being constituted by the original-luminance contrast ($C_o$(x, y)).

The converting part 124 of the fade-luminance calculation part 120 converts the ambient illuminance ($I_E$) as input into a corresponding ambient luminance ($Y_E$) (S240). The fade-luminance calculation part 120 may perform the conversion with reference to a pre-stored ($I_E$)-($Y_E$) conversion table. The ambient luminance ($Y_E$) and the corresponding ambient illuminance ($I_E$) are stored in the ($I_E$)-($Y_E$) conversion table in a form of a database.

Next, the first adding part 122 adds the ambient luminance ($Y_E$) with the original-luminance ($Y_F$(x, y)), and thus calculates the fade-luminance ($Y_o$(x, y)) (S250). The fade-luminance ($Y_F$(x, y)) may be calculated as shown in expression (4):

$$Y_F(x,y)=Y_o(x,y)+Y_E \tag{4}$$

Next, by using the fade-luminance ($Y_F$(x, y)) as being input to the second LPF 152 of the defade-luminance calculating part 150 and the fade-luminance values with respect to the neighboring pixels, the fade-average luminance ($L_F$(x, y)) is calculated (S260). The second LPF 152 may be embodied in the same way as the first LPF 112.

Meanwhile, the second adding part 154 adds the original-luminance contrast ($C_o$(x, y)) and a predetermined weight (w), and outputs the result of addition ($C_o$(x, y)+w) (S270). The weight (w) may be selected from any value and may be set and/or changed. The weight (w) may be set to '1'.

The multiplying part 156 calculates the defade-luminance ($Y_{DF}$(x, y)), by multiplying the fade-average luminance ($L_F$(x, y)) by the result of the addition, ($C_o$(x, y)+w), (S280). The defade-luminance ($Y_{DF}$(x, y)) may be calculated as shown in expression (5):

$$Y_{DF}(x, y)=(C_o(x, y)+w)\times L_F(x, y) \tag{5}$$

When 'w=1', the defade-luminance contrast ($C_{DF}$(x,y)), which is the luminance contrast with respect to the defade-luminance ($Y_{DF}$(x, y)), becomes identical to the original-luminance contrast ($C_o$(x,y)), which is the luminance contrast with respect to the original-luminance ($Y_o$(x,y)). More specifically, the defade-luminance contrast ($C_{DF}$(x,y)) may be calculated as shown in expression (6):

$$C_{DF}(x, y) = \frac{Y_{DF}(x, y) - L_F(x, y)}{L_F(x, y)} \tag{6}$$

When 'w=1' is set and the expression 5 is appropriately rearranged, the right side of the expression (6) becomes identical to the original-luminance contrast ($C_o$(x, y)), and as a result, the defade-luminance contrast ($C_{DF}$(x,y)) becomes identical to the original-luminance contrast ($C_o$(x, y)) as shown in expression (7).

$$C_{DF}(x, y) = \frac{Y_{DF}(x, y) - L_F(x, y)}{L_F(x, y)} = C_O(x, y) \tag{7}$$

When the defade-luminance ($Y_{DF}$(x, y)) is out of a predetermined range, the limiting part 158 limits the defade-luminance ($Y_{DF}$(x, y)) within the predetermined range, to output a final defade-luminance ($Y'_{DF}$(x, y)) (S290).

More specifically, when the defade-luminance ($Y_{DF}(x, y)$) is smaller than a sum of a predetermined lowest luminance ($Y_L$) and the ambient luminance ($Y_E$), ($Y_L+Y_E$), the limiting part 158 converts the defade-luminance ($Y_{DF}(x, y)$) to ($Y_L+Y_E$). When the defade-luminance ($Y_{DF}(x, y)$) exceeds the sum of a predetermined highest luminance ($Y_H$) and the ambient luminance ($Y_E$), ($Y_H+Y_E$), the limiting part 158 converts the defade-luminance ($Y_{DF}(x, y)$) to the sum ($Y_H+Y_E$). When the defade-luminance ($Y_{DF}(x, y)$) is not less than ($Y_L+Y_E$) and not more than ($Y_H+Y_E$), the limiting part 158 directly outputs the defade-luminance ($Y_{DF}(x, y)$) without conversion. Accordingly, $Y'_{DF}(x, y)$ becomes identical to $Y_{DF}(x, y)$. The calculation of the final defade-luminance in the operation 290 may be expressed by (i), (ii) and (iii) as follows:

i) If $Y_{DF}(x, y)<(Y_L+Y_E)$, then $Y'_{DF}(x, y)=(Y_L+Y_E)$.

ii) If $Y_{DF}(x, y)>(Y_H+Y_E)$, then $Y'_{DF}(x, y)=(Y_H+Y_E)$.

iii) If $(Y_L+Y_E)\leqq(Y_{DF}(x,y)\leqq(Y_H+Y_E)$, then $Y'_{DF}(x, y)=Y_{DF}(x, y)$.

Next, the display-luminance calculation part 160 calculates display-luminance ($Y_D(x, y)$), by subtracting the ambient luminance ($Y_E$) from the final defade-luminance ($Y'_{DF}(x, y)$) and (S300). The display-luminance ($Y_D(x, y)$) may be calculated as shown in expression 8:

$$Y_D(x,y)=Y'_{DF}(x,y)-Y_E \quad (8)$$

The calculated display-luminance ($Y_D(x, y)$) is used in displaying the image on a screen. Because the display-luminance ($Y_D(x, y)$) has enhanced luminance contrast through luminance adjustment based on the ambient illuminance, the image can be displayed using the display-luminance ($Y_D(x, y)$) with a reduced fade phenomenon even when ambient illuminance is very high (that is, even when the ambient environment is very bright).

Figure 5A:
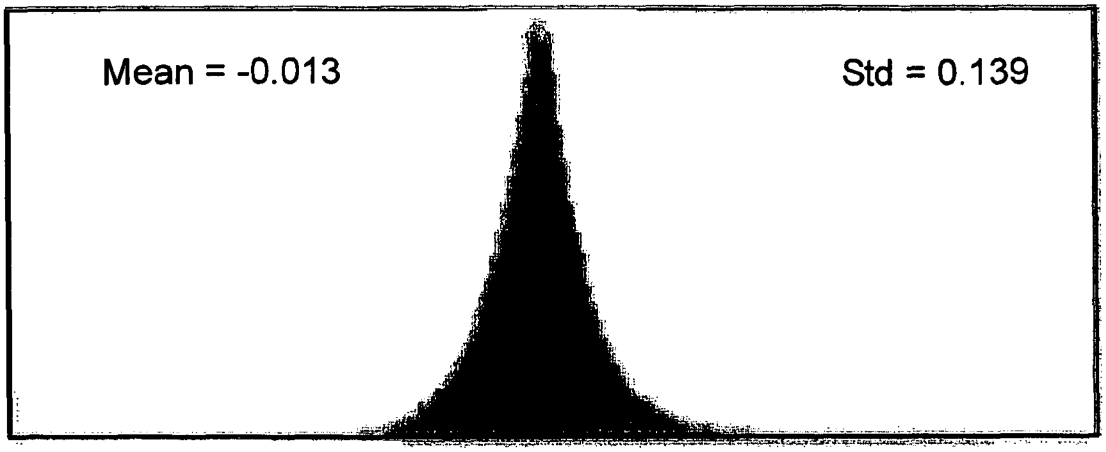
FIGS. 5A to 5C are graphs to show the result of reducing fade phenomenon generated due to the high ambient illuminance according to an embodiment of the present invention.
Figure 5B:
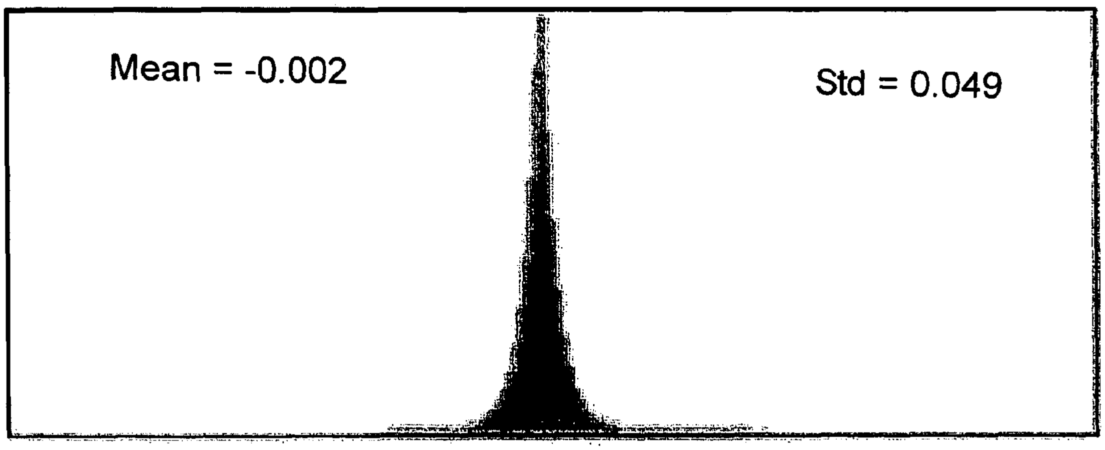
Figure 5C:
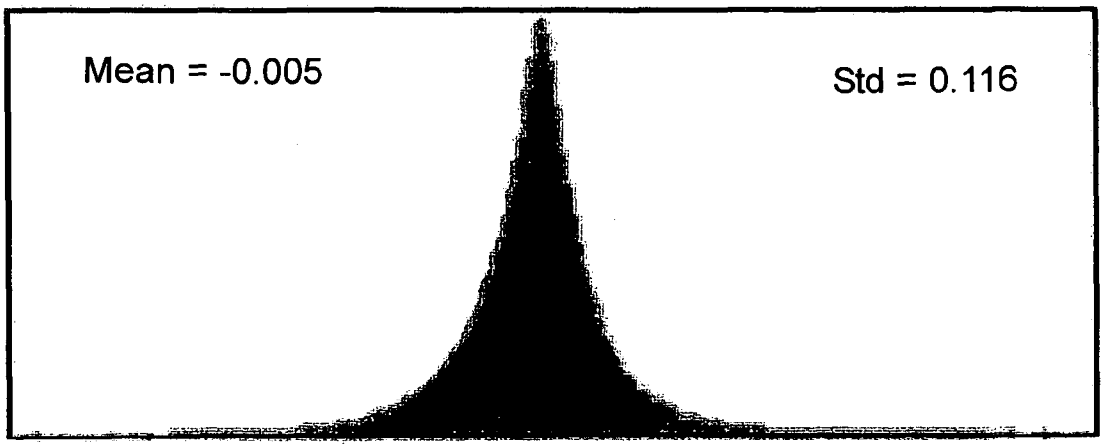

FIG. 5A shows the luminance contrast of the original image, and FIG. 5B shows the fade phenomenon due to reduction of luminance contrast due to high ambient illuminance. FIG. 5C shows the enhancement of luminance contrast which is obtained by adjusting the luminance according to aspects of the present invention, reducing the fade phenomenon. Mean and standard deviation (std) values are as shown in FIGS. 5A, 5B and 5C.

As described above luminance contrast can be enhanced by adjusting luminance in consideration of ambient illuminance, accordingly reducing the fade phenomenon. As a result, a clearer image can be provided even with high ambient illuminance.

The foregoing embodiments and advantages are merely exemplary and are not to be construed as limiting the present invention. The present teaching can be readily applied to other types of apparatuses. Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. An image enhancement method, comprising:

calculating an original-luminance contrast which is a luminance contrast between an original-luminance of pixels forming an original input image;

calculating a fade-luminance by reflecting a variation of perceived luminance based on an ambient illuminance into the original-luminance;

calculating a defade-luminance by using the original-luminance contrast and a fade-average luminance with respect to the calculated fade-luminance to maintain the original-luminance contrast; and calculating a display-luminance for displaying an output image by reflecting the variation of luminance as perceived by the ambient illuminance, into the defade-luminance.

2. The image enhancement method of claim 1, wherein the calculating of the defade-luminance comprises:

calculating the fade-average luminance by using the fade-luminance and the fade-luminance values with respect to neighboring pixels;

adding the original-luminance contrast and a predetermined weight; and multiplying the fade-average luminance by a result of the adding, and outputting a result of the multiplying as the defade-luminance.

3. The image enhancement method of claim 2, wherein the predetermined weight is '1'.

4. The image enhancement method of claim 2, wherein the calculating of the defade-luminance further comprises:

limiting the defade-luminance within a predetermined luminance range.

5. The image enhancement method of claim 4, wherein:

when the defade-luminance is less than a first sum, which is the sum of an ambient luminance corresponding to the ambient illuminance and a predetermined lowest luminance, the limiting of the defade-luminance comprises changing the defade-luminance to the first sum, and when the defade-luminance exceeds a second sum, which is the sum of the ambient luminance corresponding to the ambient illuminance and a predetermined highest luminance, the limiting of the defade-luminance comprises changing the defade-luminance to the second sum.

6. The image enhancement method of claim 1, wherein the calculating of the display-luminance comprises:

subtracting the ambient luminance corresponding to the ambient illuminance from the defade-luminance and outputting the result of the subtracting as the display-luminance.

7. The image enhancement method of claim 1, wherein the calculating of the original-luminance contrast comprises:

calculating an original-average luminance by using the original-luminance and original-luminance values with respect to neighboring pixels;

calculating an original-luminance difference by subtracting the original-average luminance from the original-luminance; and dividing the original-luminance difference by the original-average luminance, and outputting the result of the dividing as the original-luminance contrast.

8. The image enhancement method of claim 1, wherein the calculating of the fade-luminance comprises:

converting the ambient illuminance, as being input, into a corresponding ambient luminance;

adding the ambient luminance and the original-luminance; and outputting the result of the adding as the fade-luminance.

9. The image enhancement method of claim 8, wherein the calculating of the fade-luminance further comprises:

inputting a value corresponding to the ambient illuminance.

10. The image enhancement method of claim 8, wherein the calculating of the fade-luminance further comprises:

sensing the ambient illuminance to input the ambient illuminance value.

11. An image enhancement apparatus, comprising:

an original-luminance contrast calculation part calculating an original-luminance contrast which is a luminance contrast between an original-luminance of pixels forming an original input image;

a fade-luminance calculation part calculating a fade-luminance by reflecting a variation of luminance as perceived based on an ambient illuminance into the original-luminance;

a defade-luminance calculation part calculating a defade-luminance by using the original-luminance contrast and a fade-average luminance with respect to the fade-luminance, which is calculated by the fade-luminance calculation part, to maintain the original-luminance contrast which is calculated by the original-luminance contrast calculation part; and a display-luminance calculation part calculating a display-luminance for displaying an output image by reflecting the variation of luminance as perceived by the ambient illuminance into the defade-luminance calculated by the defade-luminance calculation part.

12. The image enhancement apparatus of claim 11, wherein the defade-luminance calculation part comprises:

a low pass filter (LPF) calculating the fade-average luminance by using the fade-luminance calculated by the fade-luminance calculation part and fade-luminance values with respect to neighboring pixels;

an adding part adding the original-luminance contrast calculated by the original-luminance contrast calculation part and a predetermined weight; and a multiplying part multiplying the fade-average luminance calculated by the LPF by the result of adding t, and outputting the result of multiplication as the defade-luminance.

13. The image enhancement apparatus of claim 12, wherein the predetermined weight is ‘1’.

14. The image enhancement apparatus of claim 12, wherein the defade-luminance calculation part further comprises a limiting part limiting the defade-luminance within a predetermined luminance range.

15. The image enhancement apparatus of claim 14, wherein:

when the defade-luminance is less than a first sum, which is the sum of ambient luminance corresponding to the ambient illuminance and a predetermined lowest luminance, the limiting part limits the defade-luminance to the first sum, and when the defade-luminance exceeds a second sum, which is the sum of the ambient luminance corresponding to the ambient illuminance and a predetermined highest luminance, the limiting part limits the defade-luminance to the second sum.

16. The image enhancement apparatus of claim 11, wherein the display-luminance calculation part subtracts the ambient luminance corresponding to the ambient illuminance from the defade-luminance, and outputs the result of the subtracting as the display-luminance.

17. The image enhancement apparatus of claim 11, wherein the original-luminance contrast calculation part comprises:

a low pass filter (LPF) calculating an original-average luminance by using the original-luminance and original-luminance values with respect to neighboring pixels;

a subtracting part calculating an original-luminance difference by subtracting and the original-average luminance which is calculated by the LPF from the original-luminance; and a dividing part dividing the original-luminance difference calculated by the subtracting part, by the original-average luminance calculated by the LPF, and outputting the result of division as the original-luminance contrast.

18. The image enhancement apparatus of claim 11, wherein the fade-luminance calculation part comprises:

a converting part converting the ambient illuminance as being inputted, into a corresponding ambient luminance; and an adding part adding the external luminance converted by the converting part, with the original-luminance, and outputting the result of adding as the fade-luminance.

19. The image enhancement apparatus of claim 18, further comprising:

an ambient illuminance sensing part sensing the ambient illuminance of the apparatus and inputs and inputting the ambient illuminance to the converting part.

20. The image enhancement apparatus of claim 18, further comprising:

an ambient illuminance input part operable by a user to input a value corresponding to the ambient illuminance to the converting part.

* * * * *

UNITED STATES PATENT AND TRADEMARK OFFICE

CERTIFICATE OF CORRECTION

PATENT NO. : 7,995,851 B2
APPLICATION NO. : 11/353955
DATED : August 9, 2011
INVENTOR(S) : Lee et al.

It is certified that error appears in the above-identified patent and that said Letters Patent is hereby corrected as shown below:

First Page, Item (75) Column 1 (Inventors), Line 2, Delete "Chang-veong Kim," and insert -- Chang-yeong Kim, --, therefor.

Column 10, Line 38, In Claim 19, delete "and inputs and inputting" and insert -- and inputting --, therefor.

Signed and Sealed this
Twelfth Day of June, 2012

David J. Kappos
*Director of the United States Patent and Trademark Office*